United States Patent
Abe et al.

(10) Patent No.: US 9,277,076 B2
(45) Date of Patent: Mar. 1, 2016

(54) IMAGE PROCESSING APPARATUS AND METHOD FOR PERFORMING CALIBRATION FOR PRINTING

(71) Applicant: CANON KABUSHIKI KAISHA, Tokyo (JP)

(72) Inventors: Seiji Abe, Kawasaki-shi (JP); Mitsuru Uratani, Kawasaki-shi (JP); Yuki Ishida, Kawasaki-shi (JP); Yuki Omagari, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/683,334

(22) Filed: Nov. 21, 2012

(65) Prior Publication Data

US 2013/0135686 A1    May 30, 2013

(30) Foreign Application Priority Data

Nov. 25, 2011 (JP) .................................. 2011-257431

(51) Int. Cl.
| H04N 1/46 | (2006.01) |
| --- | --- |
| G03F 3/08 | (2006.01) |
| H04N 1/60 | (2006.01) |
| G06K 9/00 | (2006.01) |
| H04N 1/00 | (2006.01) |

(52) U.S. Cl.
CPC ......... *H04N 1/00819* (2013.01); *H04N 1/6033* (2013.01); *H04N 1/6055* (2013.01)

(58) Field of Classification Search
None
See application file for complete search history.

(56) References Cited

U.S. PATENT DOCUMENTS

| 5,162,841 | A | * | 11/1992 | Terashita ......................... 355/38 |
| --- | --- | --- | --- | --- |
| 5,309,256 | A | * | 5/1994 | Takada et al. ................. 358/504 |
| 5,363,318 | A | * | 11/1994 | McCauley ...................... 702/85 |
| 5,502,799 | A | * | 3/1996 | Tsuji et al. ..................... 345/600 |
| 5,579,090 | A | * | 11/1996 | Sasanuma et al. .............. 399/49 |
| 5,838,465 | A | * | 11/1998 | Satou et al. .................... 358/520 |
| 5,856,876 | A | * | 1/1999 | Sasanuma et al. ............. 358/300 |
| 6,156,465 | A | * | 12/2000 | Cao et al. ......................... 430/30 |
| 6,160,643 | A | * | 12/2000 | Deschuytere et al. ........ 358/504 |
| 7,365,877 | B2 | * | 4/2008 | Meier et al. ..................... 358/1.9 |
| 7,545,536 | B2 | * | 6/2009 | Hayashi ........................ 358/1.9 |
| 7,965,417 | B2 | * | 6/2011 | Ishikawa ...................... 358/3.01 |
| 8,717,647 | B2 | * | 5/2014 | Gila et al. ..................... 358/504 |
| 2001/0004284 | A1 | * | 6/2001 | Fukuda et al. ................. 355/29 |
| 2003/0002096 | A1 | * | 1/2003 | Sugiyama ..................... 358/518 |
| 2004/0086176 | A1 | * | 5/2004 | Meier et al. ................... 382/162 |
| 2004/0095591 | A1 | * | 5/2004 | Takahashi ...................... 358/1.9 |
| 2005/0083540 | A1 | * | 4/2005 | Hersch et al. .................. 358/1.9 |

(Continued)

FOREIGN PATENT DOCUMENTS

JP          9-116768 A          5/1997

*Primary Examiner* — Madelein Nguyen
(74) *Attorney, Agent, or Firm* — Canon USA, Inc. I.P. Division

(57) ABSTRACT

An image processing apparatus includes a measurement unit configured to read a patch image for a calibration which is printed on a recorded medium by a printing apparatus and measure a density of the patch image, a reception unit configured to receive spectral reflection factor information measured by reading the patch image for the calibration printed on the recorded medium by using a measurement device capable of measuring a spectral reflection factor at every predetermined wavelengths, and a processing unit configured to perform a calibration for a printing using the recorded medium by the printing apparatus on the basis of the density measured by the measurement unit and the spectral reflection factor information received by the reception unit.

15 Claims, 13 Drawing Sheets

(56) References Cited

U.S. PATENT DOCUMENTS

| | | | |
|---|---|---|---|
| 2005/0206928 A1* | 9/2005 | Itagaki | 358/1.9 |
| 2006/0164700 A1* | 7/2006 | Hayashi | 358/518 |
| 2006/0280360 A1* | 12/2006 | Holub | G01J 3/02 382/162 |
| 2007/0153340 A1* | 7/2007 | Itagaki et al. | 358/504 |
| 2007/0229923 A1* | 10/2007 | Itagaki et al. | 358/504 |
| 2008/0144060 A1* | 6/2008 | Ishikawa | 358/1.9 |
| 2010/0321434 A1* | 12/2010 | Baba | 347/12 |
| 2011/0032553 A1* | 2/2011 | Funahashi | 358/1.9 |
| 2012/0019669 A1* | 1/2012 | Bai et al. | 348/187 |
| 2012/0183213 A1* | 7/2012 | Robles-Kelly | G06K 9/00362 382/165 |
| 2013/0038867 A1* | 2/2013 | Ebihara et al. | 356/300 |
| 2013/0257971 A1* | 10/2013 | Eiyama | 347/19 |

* cited by examiner

FIG. 8

| DATA TYPE | MEDIUM | MEDIUM RELATED INFORMATION ||||||
|---|---|---|---|---|---|---|---|
| | | COLORANT ||||||
| | | CYAN | LIGHT CYAN | MAGENTA | LIGHT MAGENTA | YELLOW | BLACK |
| REAL MACHINE PRINT DENSITY DATA | LOADED MEDIUM | 〰 | 〰 | 〰 | 〰 | 〰 | 〰 |
| CALIBRATION TARGET VALUE | MEDIUM A | 〰 | 〰 | 〰 | 〰 | 〰 | 〰 |
| | MEDIUM B | 〰 | 〰 | 〰 | 〰 | 〰 | 〰 |
| | ⋮ | | | | | | |
| | MEDIUM G | 〰 | 〰 | 〰 | 〰 | 〰 | 〰 |
| | ADDED MEDIUM X | 〰 | 〰 | 〰 | 〰 | 〰 | 〰 |
| SPECTRAL REFLECTION FACTOR CHARACTERISTIC INFORMATION OF COLORANT | MEDIUM A | 〰 | 〰 | 〰 | 〰 | 〰 | 〰 |
| | MEDIUM B | 〰 | 〰 | 〰 | 〰 | 〰 | 〰 |
| | ⋮ | | | | | | |
| | MEDIUM G | 〰 | 〰 | 〰 | 〰 | 〰 | 〰 |
| | ADDED MEDIUM X | 〰 | 〰 | 〰 | 〰 | 〰 | 〰 |

| DATA TYPE | SENSOR UNIT RELATED INFORMATION |||
|---|---|---|---|
| | R-LED CHARACTERISTIC | G-LED CHARACTERISTIC | B-LED CHARACTERISTIC |
| REFERENCE SENSOR LIGHT RECEPTION CHARACTERISTIC INFORMATION | ⋀ | ⋀ | ⋀ |
| REAL MACHINE SENSOR LIGHT RECEPTION CHARACTERISTIC INFORMATION | ⋀ | ⋀ | ⋀ |

IMAGE PROCESSING APPARATUS AND METHOD FOR PERFORMING CALIBRATION FOR PRINTING

BACKGROUND OF THE INVENTION

1. Field of the Invention

The present invention relates to an image processing apparatus configured to perform a calibration for a printing and an image processing method.

2. Description of the Related Art

In a printing apparatus that prints an image by applying a recorded medium such as a sheet with a recording material (colorant) such as ink, a color appearance of a print result or the like may fluctuate because of a change in a printing environment and a change over time of the printing apparatus. Also, among plural printing apparatuses, a difference in the color appearance of the print result or the like may occur for each apparatus.

Accordingly, in order that the fluctuation of the print result caused by the change in the environment and the change over time, the difference in the print result for each apparatus, and the like are resolved, a printing apparatus is proposed which reads a print result by a reading apparatus and analyzes the print result to correct parameters for a print processing (Japanese Patent Laid-Open No. 9-116768).

In addition, when the print result is read by the reading apparatus in the above-mentioned manner, it is possible to obtain the print result having a more satisfactory image quality if a reading apparatus that can obtain more detailed information is used to analyze the print result for performing the correction on the parameters for the printing.

However, the reading apparatus that can obtain more detailed information in the above-described manner is expensive, and if the respective printing apparatuses are mounted with the reading apparatuses, costs are increased. In addition, in a case where the print results by the respective printing apparatuses are read while this reading apparatus is detached, work burden of an operator is increased.

SUMMARY OF THE INVENTION

The present invention has been made in view of the above-described problems and provides an image processing apparatus and an image processing method with which it is possible to easily conduct a calibration for a printing in plural printing apparatuses at a high precision.

To solve the above-described problem, an image processing apparatus according to an aspect of the present invention includes: a measurement unit configured to read a patch image for a calibration which is printed on a recorded medium by a printing apparatus and measure a density of the patch image; a reception unit configured to receive spectral reflection factor information measured by reading the patch image for the calibration printed on the recorded medium by using a measurement device capable of measuring a spectral reflection factor at every predetermined wavelengths; and a processing unit configured to perform a calibration for a printing using the recorded medium by the printing apparatus on the basis of the density measured by the measurement unit and the spectral reflection factor information received by the reception unit.

In addition, an image processing apparatus according to another aspect of the present invention includes: a first measurement unit configured to read a patch image for a calibration which is printed on a recorded medium by a printing apparatus and measure a density of the patch image; a second measurement unit configured to read the patch image for the calibration which is printed on the recorded medium by using a measurement device capable of measuring a spectral reflection factor at every predetermined wavelengths and to measure a spectral reflection factor of the patch image; a processing unit configured to execute a calibration for a printing using the recorded medium by the printing apparatus on the basis of the density measured by the first measurement unit and spectral reflection factor information measured by the second measurement unit; and a transmission unit configured to transmit the spectral reflection factor information measured by the second measurement unit to another image processing apparatus.

Further features of the present invention will become apparent from the following description of exemplary embodiments with reference to the attached drawings.

BRIEF DESCRIPTION OF THE DRAWINGS

FIG. 8 is a conceptual diagram of sensor correction information.

DESCRIPTION OF THE EMBODIMENTS

Figure 1:
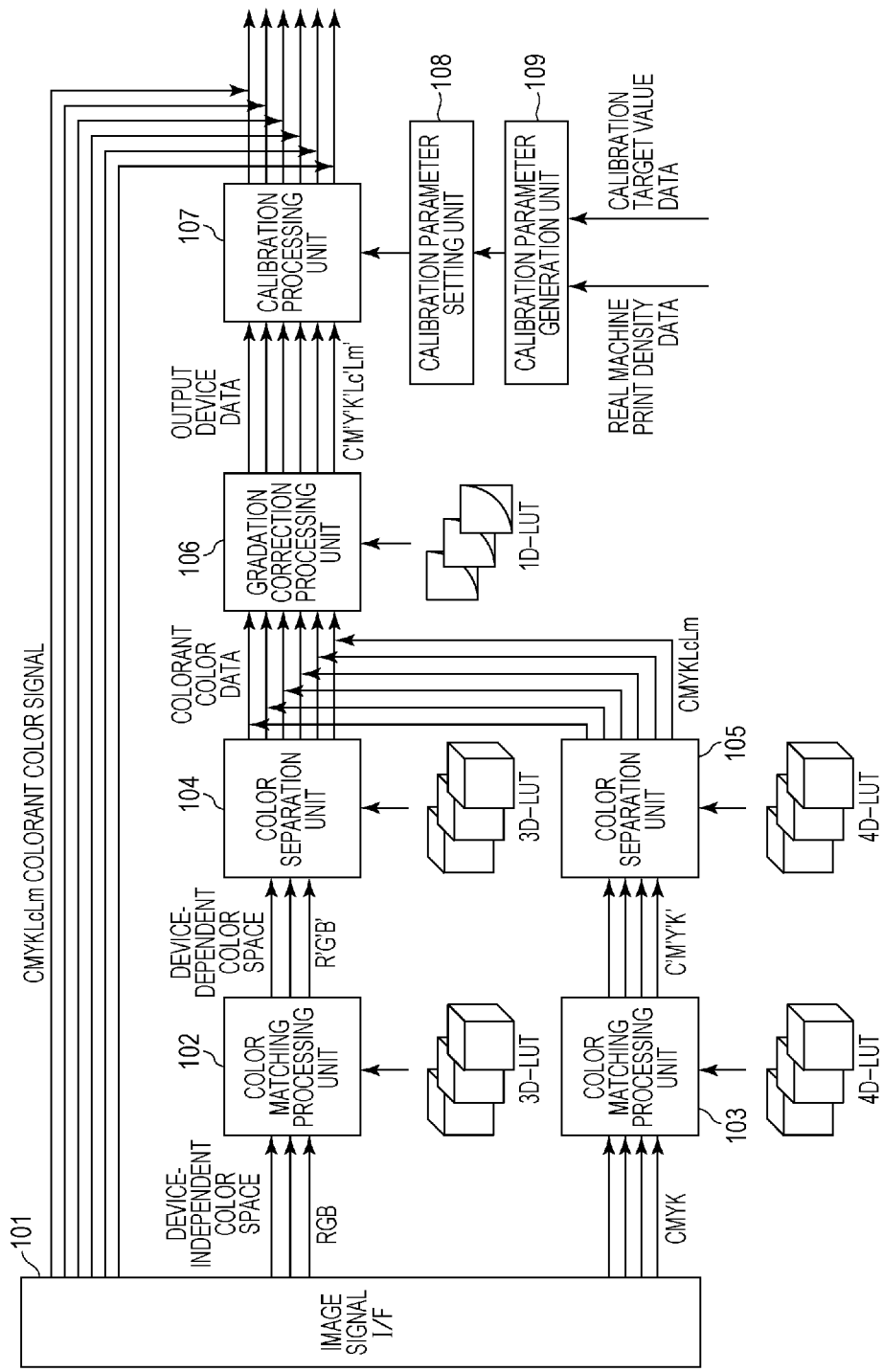
FIG. 1 illustrates a flow of a processing at a time of printing according to an embodiment of the present invention.

Hereinafter, exemplified embodiments of the present invention will be described with reference to the drawing.

According to the present exemplified embodiment, an ink-jet printer (hereinafter, which will also be simply referred to as "printer") is provided with a color sensor including light sources such as LEDs of R (red), G (green), and B (blue) and a light receiving element such as a photo diode for reading (measuring) an image of a patch chart printed on a sheet. For a configuration of reading the patch chart, various configurations other than the above can also be adopted. The printer according to the present exemplified embodiment can also print various documents, images, and the like based on input printing data. In addition, the printer is provided with ink of six colors including C (cyan), M (magenta), Y (yellow), K (black), Lc (light cyan) prepared by diluting C, and Lm (light magenta) prepared by diluting M as recording materials (colorants) to be used for the printing. It is noted that an ink combination is not limited to this, and the printer may be provided with special color ink of R (red), G (green), B (blue), Gy (gray), and the like or may simply be provided with only C, M, and Y or only C, M, Y, and K. In addition, the colorant is not limited to the ink, and various materials such as toner can also be adopted.

FIG. 1 is an explanatory diagram for describing a color conversion processing carried out by an image processing unit within the printer according to the present exemplified embodiment. The image processing unit has a function of inputting an RGB signal as image data to be converted into CMYKLcLm and a function of inputting a CMYK signal as image data to be converted into CMYKLcLm. In addition, the image data is processed as being quantized into 8 bits per pixel for each color, but the quantization number may also be set as 10 bits, 12 bits, 16 bits, or the like.

In FIG. 1, an image signal I/F 101 inputs the image data that is generated by an external apparatus such as a host PC which will be described below or generated within the printer. Herein, the image data represented as the RGB signal, the CMYK signal, or the CMYKLcLm signal is input. The input RGB signal or CMYK signal is color data of a device-independent color space (which is not inherent to the printer), and this data is subjected to a color space conversion by color matching processing units 102 and 103 configured to convert data into a device-dependent color space (which is inherent to the printer). The RGB signal input to the color matching processing unit 102 is subjected to the color space conversion to be converted into an R'G'B' signal, and the CMYK signal input to the color matching processing unit 103 is converted into a C'M'Y'K' signal. The image data processed by the color matching processing units 102 and 103 is converted into colorant color data CMYKLcLm in accordance with the colorants used at the time of the printing in color separation units 104 and 105. Subsequently, a gradation correction of the colorant color data is carried out by a gradation correction processing unit 106 configured to correct a gradation in accordance with an output characteristic of the printer.

The color matching processing units 102 and 103, the color separation units 104 and 105, and the gradation correction processing unit 106 each obtain a conversion result by converting the input image data by using a look-up table (LUT). The LUT herein is prepared for each recorded medium (type of the sheet) and each print mode (such as a high speed printing or a low speed (high quality) printing). The color matching processing units 102 and 103 and the color separation units 104 and 105 perform the conversion processing by using a multi-dimensional LUT (3D-LUT, 4D-LUT), and the gradation correction processing unit 106 perform the conversion processing by using a one-dimensional LUT (1D-LUT). The 3D-LUT is a table corresponding to while 16×16×16=4096 grids composed, for example, of 16 grids at an interval of 17 counts for each color while three colors of RGB are set as respective axes. The 4D-LUT is a table for converting four colors of CMYK into colorant color data of six colors. The 1D-LUT is a table for converting a gradation of each of the input image data of the respective colors for an output on a one-on-one basis. Various color conversion tables in related art can be adopted for modes of the tables.

Image data (output device data) corresponding to the respective pieces of colorant color data processed in accordance with a characteristic of the printer which is output from the gradation correction processing unit 106 is processed by a calibration processing unit 107. The calibration processing unit 107 performs a calibration for correcting a fluctuation of printed results caused by an individual difference, a change over time, or the like of a print engine of the printer, the recorded medium, or the colorant (a stability for densities of the respective colorants). The calibration processing unit 107 performs the conversion by using the 1D-LUT. The 1D-LUT is used for obtaining a correction value on the basis of real machine print density data (data obtained by measuring a density value of an image actually printed by the printer on the basis of predetermined input image data) and calibration target value data (a reference density value with respect to the predetermined input image data). The correction value output by the 1D-LUT is generated by a calibration parameter generation unit 109 and set in the calibration processing unit 107 by a calibration parameter setting unit 108.

Image data on a calibration patch chart at a time when the calibration is conducted by the calibration processing unit 107 is output via the image signal I/F 101 as a colorant color signal of CMYKLcLm. This colorant color signal is subjected to a binarization processing through a half toning processing without the mediation of the respective processing units 102 to 107 and is thereafter sent to the print engine and printed as the image on the recorded medium.

Figure 2:
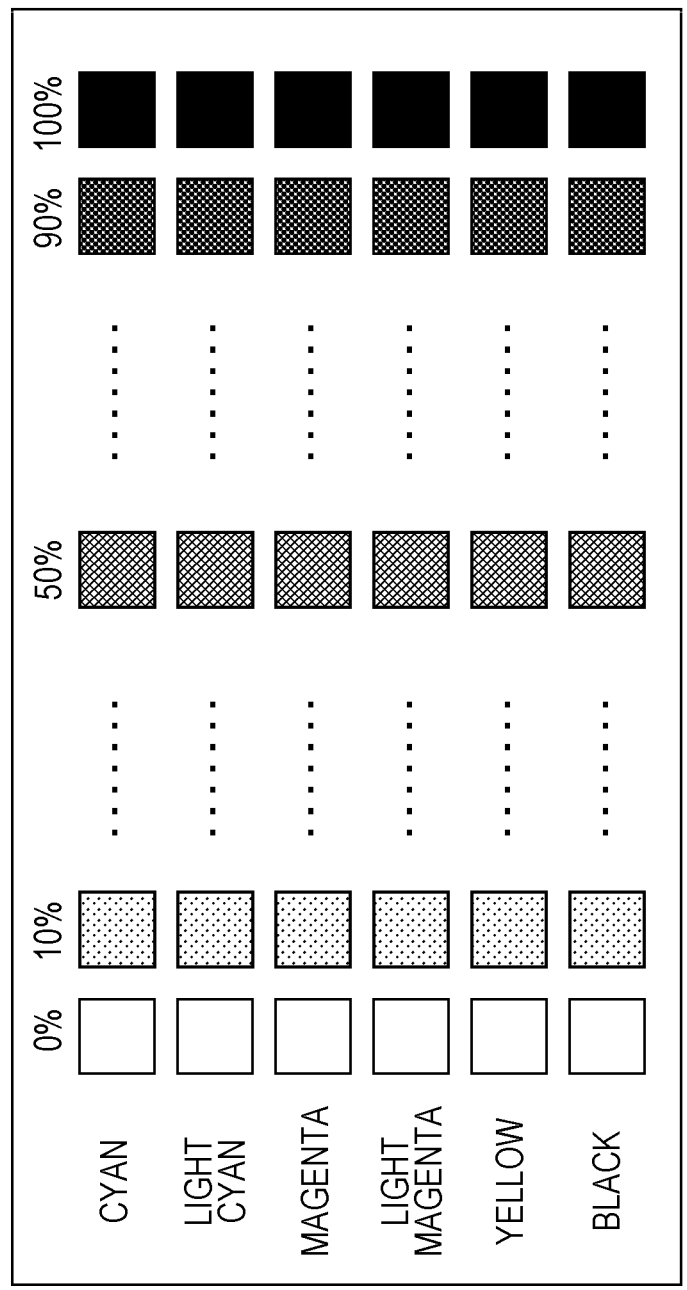
FIG. 2 illustrates an example of a patch chart for a calibration.

FIG. 2 illustrates a print result of the calibration patch chart. This chart is used in a case where the above-described real machine print density data is measured, a case where calibration information of the recorded medium of an unidentified type (unidentified medium) is registered, or the like. The relevant patch is printed by using the respective colorants of cyan, light cyan, magenta, yellow, and black, and density values of the colorant color signals of the respective colorants are changed, for example, in units of 10%.

Figure 3:
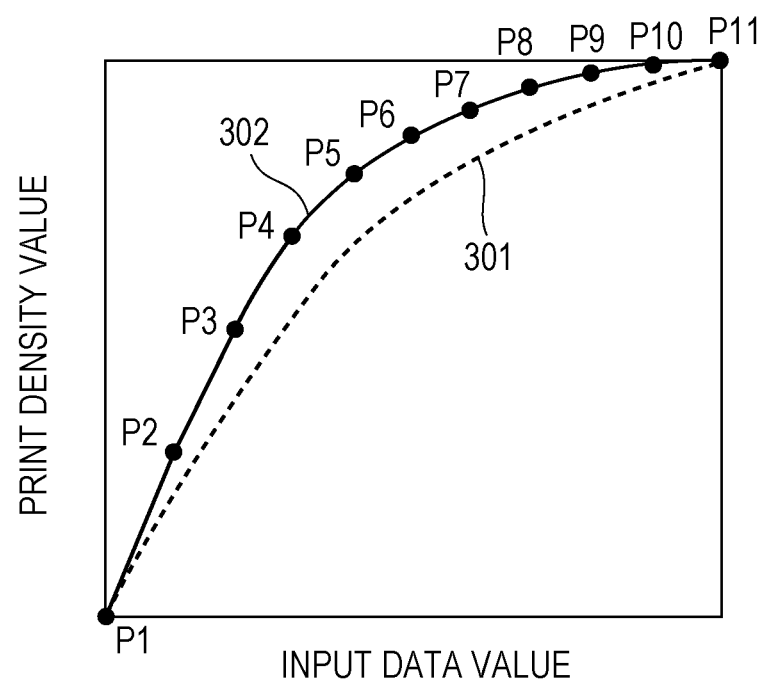
FIG. 3 illustrates a concept of a 1D-LUT for a density correction processing.

FIG. 3 is an explanatory diagram for describing the 1D-LUT used in the calibration processing unit 107 corresponding to a colorant of a predetermined color of a recorded medium of a predetermined type. That is, the above-described table exists for each type of the recorded media and each color of the colorants. In FIG. 3, the horizontal axis represents an input data value of the colorant color signal at a time when the patch of FIG. 2 is printed, and the vertical axis represents a print density value of the printed patch image. A curved line represented by a broken line 301 represents the above-described calibration target value data (reference value). Calibration target data of the recorded medium of the identified type (identified medium) is previously registered as the density values associated with the plural input data values in the memory within the printer. A curved line represented by a solid line 302 represents the real machine print density data. The real machine print density data is obtained in a manner that the patch of FIG. 2 is actually printed by the printer, and the patch is read by the reading apparatus to measure a density thereof. Real machine print density data P1 to P11 are obtained by measuring densities at parts at 0% to 100% of the respective colorants of the patch (a computation processing may be carried out in some cases). In the example of FIG. 3, the real machine print density data illustrates an example in which the density is high as a whole because of a reason that the ejection amount is high with respect to the reference value or the like, and the printing is conducted at a still higher density at an intermediate density part. The calibration processing unit 107 calculates a correction parameter for converting and correcting a contone (continuous tone) colorant signal for the individual colorant colors so that the real machine print density data has the print density at the reference value, and when a normal image other than is printed, the printing data is corrected on the basis of the correction parameter to thereafter carry out the printing. It is noted that instead of the correction of the printing data or in addition to the correction, the correction may be carried out by controlling the ejection amount of the ink or the like.

Figure 4:
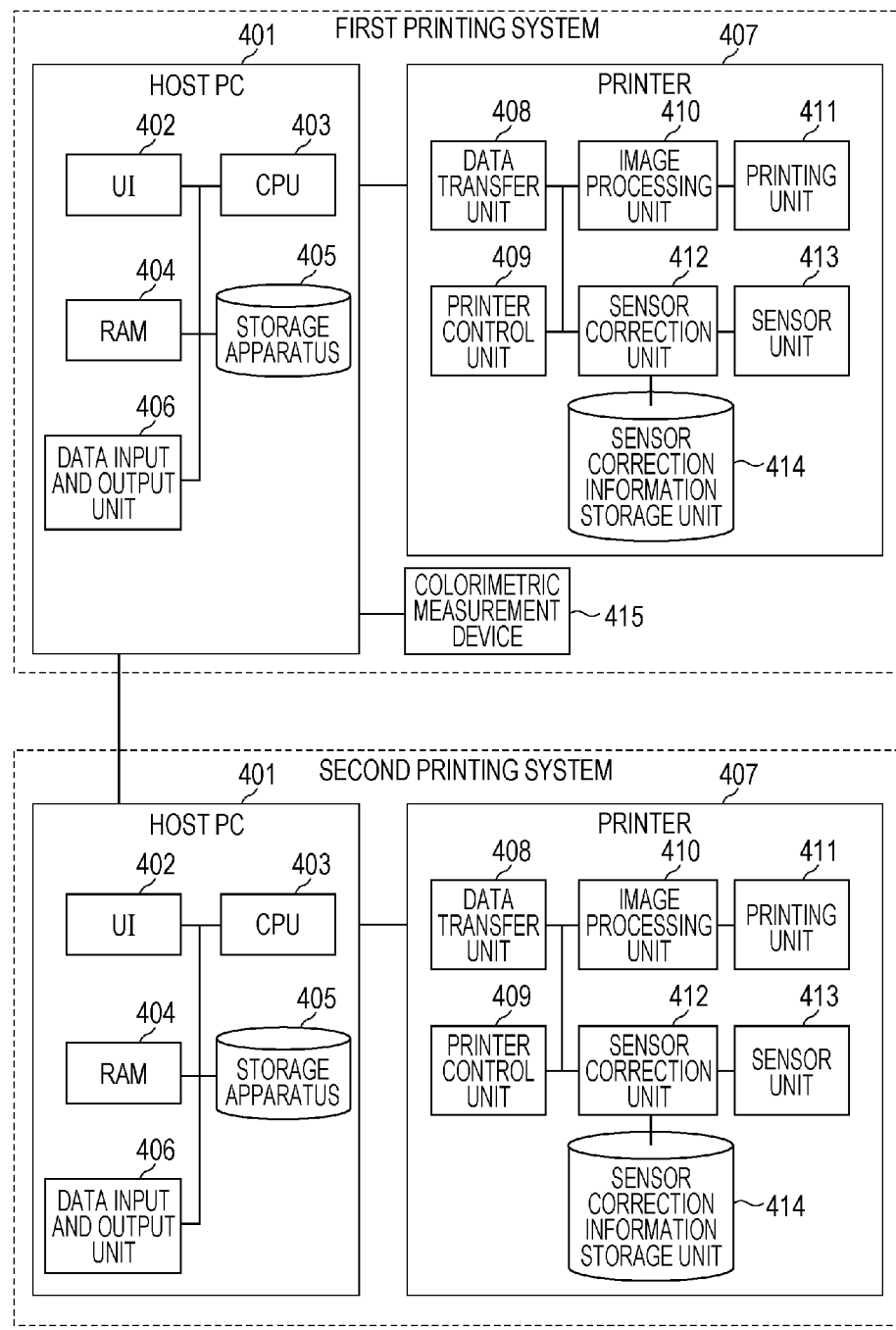
FIG. 4 is a block diagram of a system configuration according to the embodiment.

Next, a system configuration including the above-described printer will be described. FIG. 4 is a block diagram of a configuration of two sets of printing systems including the above-described printer.

In FIG. 4, a first printing system includes a host PC 401, a printer 407, and a colorimetric measurement device 415. A second printing system connected so as to be enable to communicate with the first printing system includes the host PC 401 and the printer 407 but does not include the colorimetric measurement device 415. It is noted that Herein, for simplicity of the description, only the two sets of the printing systems are illustrated, but plural first printing systems and plural second printing systems may be provided via a network. For the network, various modes including a LAN (local area network), the internet, and the like can be used for the connection.

The host PC 401 can be realized by a general personal computer and can execute various processings which will be described below by installing software. The host PC 401 is connected to the printer 407 and the colorimetric measurement device 415 so as to be enabled to mutually communicate via a network or a local interface. The host PC 401 includes a UI (user interface) 402, a CPU 403, the RAM 404, a storage apparatus 405, and a data input and output unit 406.

The UI 402 includes a key board that accept an operational input from a user, an input apparatus such as a pointing device, and a display that displays information to be provided to the user. The CPU 403 controls operations of the host PC 401, the printer 407, and the colorimetric measurement device 415. The RAM 404 is used as a work area of the CPU 403 or stores setting values and the like for the processings in the printing system. The storage apparatus 405 is a large-volume non-volatile memory and stores a control program executed by the CPU 403, printing data to be printed in the printer 407, and various pieces of data used for the processings in its own printing system. The various pieces of data includes, for example, various image processing parameters, control parameters for the print engine, adjustment parameters, sensor unit control data, colorimetric measurement device control data, and the like. The processings which will be described below are carried out when the program stored in the storage apparatus 405 is loaded onto the RAM 404 by the CPU 403 to be executed. The storage apparatus 405 may be built in the host PC 401 or externally attached. The data input and output unit 406 controls an input and an output of the data with an external part of its own printing system (such as another printing system). The data input and output unit 406 can exchange the data for the calibration, for example, with the first printing system and the second printing system. With this configuration, for example, the data for the calibration of the unidentified medium can be obtained from another printing system to carry out the calibration.

The printer 407 corresponds to the printer described by using FIGS. 1 to 3. The printer 407 includes a data transfer unit 408, a printer control unit 409, an image processing unit 410, a printing unit 411, a sensor correction unit 412, a sensor unit 413, and a sensor correction information storage unit 414.

The data transfer unit 408 receives the printing data from the host PC 401 and extracts image data and an image processing parameter from the printing data. Subsequently, the image data and the image processing parameter are sent to the image processing unit 410. Also, printer adjustment data, printer control data, and sensor unit control data sent from the host PC 401 are sent to the printer control unit 409. In addition, the data transfer unit 408 sends various pieces of information of the printer 407 to the host PC 401.

The printer control unit 409 includes a CPU, a memory, a printer control hardware (such as an ASIC), and the like and is configured to control the operation of the printer 407 by the CPU in accordance with the control program stored in the memory and control the operation of the printer 407 by using the hardware. The printer control unit 409 performs a control on printing conducted by the printer 407 in accordance with the printer control data received via the data transfer unit 408 and a control on a colorimetric measurement by the sensor unit 413 and the sensor correction unit 412 in accordance with the sensor unit control data.

The image processing unit 410 corresponds to the image processing unit described by using FIG. 1, and the printing unit 411 corresponds to the above-described print engine. The printing unit 411 includes an ink ejection mechanism, a storage unit for the recorded medium (sheet), a sheet supply mechanism, a sheet conveyance mechanism, and the like. The printing unit 411 controls an ejection of the ink and a sheet conveyance on the basis of the colorant color signal output via the image signal I/F 101 or the image data output via the calibration processing unit 107 to print the image on the sheet. The colorant color signal and the image data at that time are subjected to a binarization processing in the image processing unit 410 or the printing unit 411 and thereafter a print processing. It is noted however that in a case where the printing unit 411 can perform printing in accordance with image data where three values or more are set per pixel, a conversion in accordance with the setting may also be conducted. In addition, the printing unit 411 also performs the adjustment in accordance with the adjustment data and the processing in accordance with the printer control data on the basis of the control from the printer control unit 409. The adjustment in accordance with the adjustment data includes an adjustment on a sheet conveyance pitch, an adjustment on a height of a recording head, and the like. The processing in accordance with the printer control data includes a control on the ink ejection amount and the like.

The sensor unit 413 is a reading sensor configured to read an image printed by the printing unit 411 and measure a density of the image. The sensor correction unit 412 calculates a correction value for the calibration processing unit 107 to perform the correction on the basis of a reading result by the sensor unit 413. The sensor correction information storage unit 414 stores information used for the sensor correction unit 412 to calculates the correction value in a predetermined area of the memory of the printer 407.

Figure 7A:
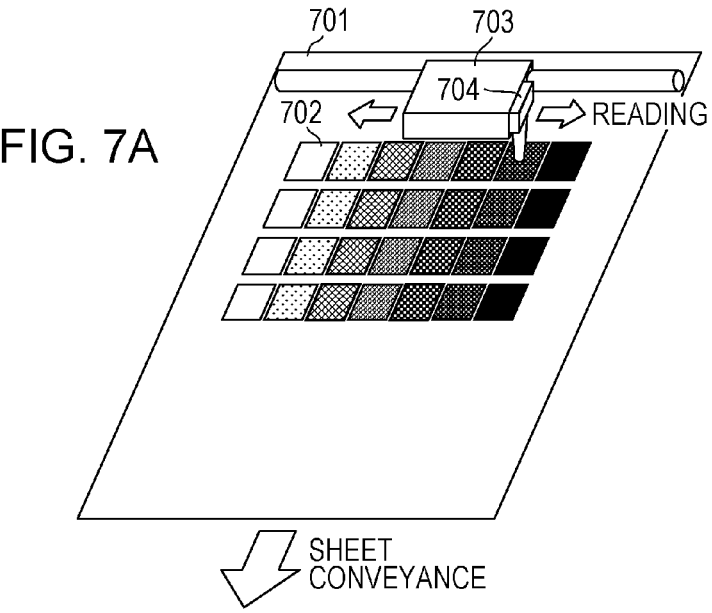
FIGS. 7A, 7B, and 7C are explanatory diagrams for describing a reading processing by a sensor unit.
Figure 7B:
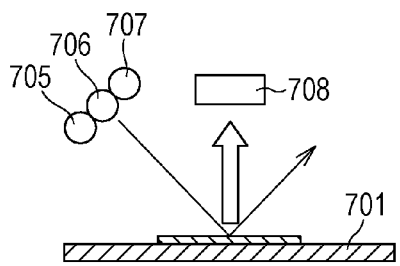
Figure 7C:
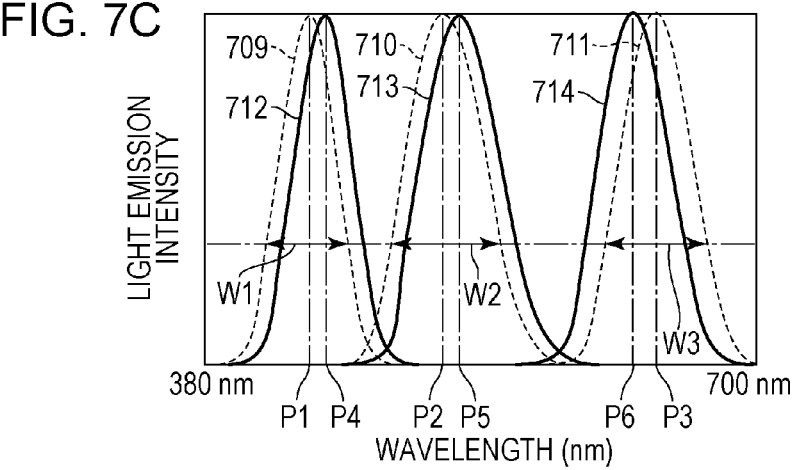

Next, a correction processing using the correction information of the sensor unit 413, the sensor correction unit 412, and the sensor correction information storage unit 414 will be described. FIGS. 7A, 7B, and 7C are explanatory diagrams for describing the correction processing.

FIG. 7A is a schematic diagram of an external view at a time when the patch image on the sheet is read by using the sensor unit 413. When a sheet 701 on which the image of the calibration patch (patch image) 702 illustrated in FIG. 2 is printed is set in the printer 407 and an instruction for a colorimetric measurement is issued, a colorimetric measurement processing is started. The sheets 701 on which the patch image 702 is printed are sequentially conveyed at a predetermined interval. Also, as illustrated in FIG. 7A, a sensor member 704 corresponding to the sensor unit 413 is attached to a carriage 703. The carriage 703 is read in a direction orthogonal to a sheet conveyance direction and sequentially reads the patch images 702 by the sensor member 704 at this time.

Therefore, when the sensor member 704 is controlled in accordance with the sensor unit control data, the printer control unit 409 also controls the carriage 703 and the sheet conveyance mechanism.

FIG. 7B is an explanatory diagram for describing the reading (colorimetric measurement) processing by the sensor unit 413 (the sensor member 704). The sensor member 704 includes a red LED 705, a green LED 706, and a blue LED 707 as the light sources and also a light receiving element 708 such as a photo diode configured to receive reflection light of light emitted to the sheet 701 from the respective light sources. For a light emission color of the LED, a light source having a complementary color with a wide density discrimination range or a color close to a complementary color depending on the color of the colorant to be measured is selected. That is, in a case where the measured colorant is cyan or light cyan, the red LED 705 is selected as the light source to carry out the measurement. Similarly, in a case where the measured colorant is magenta, light magenta, or black, the green LED 706 is selected, and in a case where the measured colorant is yellow, the blue LED 707 is selected to carry out the measurement. A light reception characteristic of the sensor member 704 relies on emission spectroscopy characteristics of the respective light sources (LED) 705 to 707 and a light reception sensitivity characteristic of the light receiving element 708. However, according to the present exemplified embodiment, a photo diode having a stable light reception sensitivity characteristic as the light receiving element 708 is used, and the emission spectroscopy characteristics of the LEDs relies on the individual difference of the sensor member 704. Therefore, the emission spectroscopy characteristics of the LEDs serve to substitute for sensor light reception characteristic information included in the sensor correction information according to the present exemplified embodiment.

FIG. 7C illustrates a spectroscopy intensity distribution as the emission spectroscopy characteristics of the respective LEDs. A curved line represented by a broken line in FIG. 7C represents a spectroscopy intensity as a reference for the respective LEDs. The spectroscopy intensity serving as the reference for the respective LEDs according to the present exemplified embodiment is based on the information previously stored in the memory of the printer 407. A curved line represented by a solid line represents an example of the spectroscopy intensity obtained while the respective LEDs 705 to 707 are caused to emit light one by one and the light is measured by using a spectral radiance meter to normalize at a peak radiance. In FIG. 7C, reference sign 709 denotes a spectroscopy intensity serving as a reference for the red LED, reference sign 710 denotes a spectroscopy intensity serving as a reference for the green LED, and reference sign 711 denotes a spectroscopy intensity serving as a reference for the blue LED. In addition, reference sign 712 denotes a spectroscopy intensity obtained by actually measuring reflected light by the light receiving element 708 when the red LED 705 emits light, reference sign 713 similarly denotes a spectroscopy intensity actually measured with regard to the green LED 706, and reference sign 714 denotes a spectroscopy intensity actually measured with regard to the blue LED 707. The spectroscopy intensity thus actually measured may include an individual difference with respect to the reference value, and the calibration correction is carried out while this individual difference is corrected. Herein, a light intensity in units of a certain interval wavelength as the emission spectroscopy characteristic is stored in the memory of the printer 407 as information on the emission spectroscopy characteristic, but instead of this, information indicating a peak wavelength and a wavelength width at a predetermined light intensity may also be used. That is, characteristic values of the reference LEDs may be set as values P1 to P3, and the wavelength widths W1 to W3 at the predetermined light intensity may be set as the information on the emission spectroscopy characteristic. Also, in addition to the above, information in various modes may be used so long as the emission spectroscopy characteristics of the respective LEDs can be identified.

The sensor correction information storage unit 414 stores the real machine print density data for the calibration actually measured with respect to the recorded medium set (mounted) to the printer 407 and the calibration target value data with respect to various media as medium related information. These pieces of data are used in the calibration processing unit 107. In addition, the medium related information also includes spectral reflection factor characteristic information for each colorant indicating results obtained by actually measuring the patch image 702 by the colorimetric measurement device 415 for each type of the media. A measurement on the spectral reflection factor characteristic by the colorimetric measurement device 415 will be described below. Also, as sensor unit related information, the sensor correction information storage unit 414 stores reference sensor light reception characteristic information representing reference sensor light reception characteristics of the above-described respective LEDs and real machine sensor light reception characteristic information corresponding to the actually measured light reception characteristics of the respective LEDs. Among these pieces of information, the calibration target value data and the reference sensor light reception characteristic information corresponding to the identified medium are previously stored in the memory of the printer 407, and for other information, the actually measured results are stored in the memory. For example, various pieces of information corresponding to an unidentified medium are newly stored in the memory through the actual measurement by its own system (apparatus) or received from another system (apparatus) via the data transfer unit 408 to be stored in the memory. In addition, it is also possible to transmit the various pieces of information corresponding to the unidentified medium obtained through the actual measurement by its own system (apparatus) via the data transfer unit 408 to be registered in another system (apparatus). With this configuration, it is possible to carry out the calibration for a new unidentified medium.

FIG. 8 is a conceptual diagram of various pieces of information stored in the sensor correction information storage unit 414. In FIG. 8, the various pieces of information are conceptually illustrated in a mode of a function graph corresponding to each piece of information but stored in the sensor correction information storage unit 414 as real numbers discrete at a predetermined interval.

In FIG. 8, the identified media are represented as medium A to medium G, and the unidentified medium is represented as medium X. The respective media are distinguished for each type such as a material of the medium or a process mode, and the types of the media include plain paper, glossy paper, and the like.

Also, the spectral reflection factor characteristic information of the colorant may not be obtained for all the types of media, and only information on used media may appropriately be stored. In addition, the spectral reflection factor characteristic may be obtained for some types of media, and the spectral reflection factor characteristic for the other types of media may be calculated through an interpolation processing on the basis of the obtained spectral reflection factor characteristic of the media. Furthermore, all the densities may not be read at the time of reading of the patch image 702, and some densities may be read to calculate the other densities through an interpolation processing.

Figure 9A:
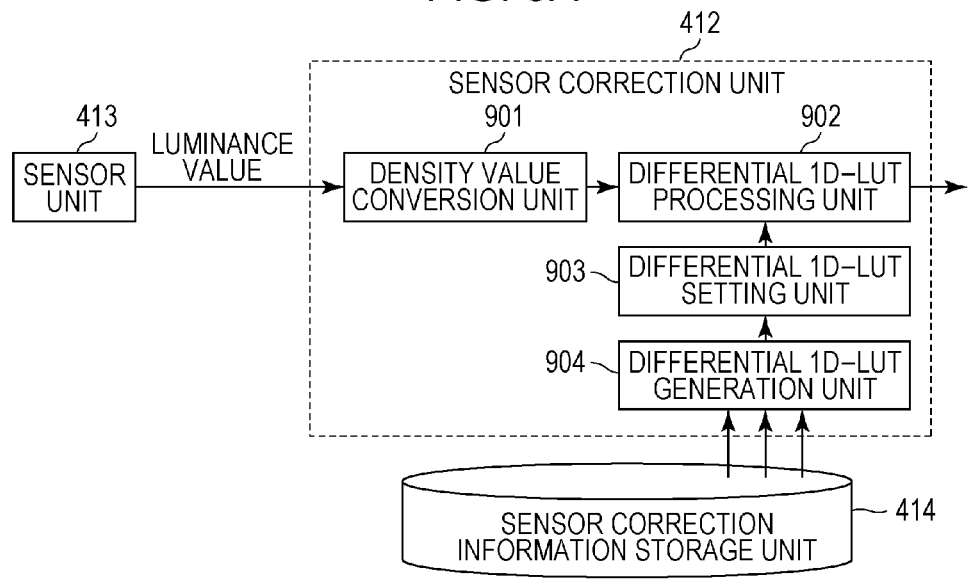
FIGS. 9A and 9B are explanatory diagrams for describing a processing by a sensor correction unit.
Figure 9B:
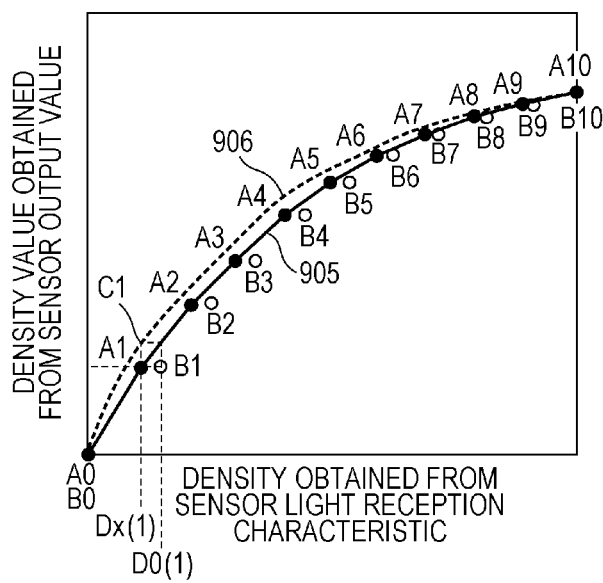

Next, an interpolation processing by the sensor correction unit 412 will be described. FIGS. 9A and 9B are explanatory diagrams for describing the interpolation processing. FIG. 9A is a block diagram illustrating a detail of a configuration of the sensor correction unit 412. Luminance data (luminance value P(X)) output from the sensor unit 413 is input to a density value conversion unit 901. The density value conversion unit 901 obtains a luminance value D(X) on the basis of sensor read luminance values P(0) and P(X) at a paper white part through (Expression 1). The sensor read luminance values at the paper white part are luminance values in a case where a part where no colorant of the sheet 701 is applied (paper white part), a reference white board, or the like is read. The luminance value D(X) converted from the luminance values by the density value conversion unit 901 is input to a differential 1D-LUT processing unit 902. It is noted that in FIG. 9A, a processing by a differential 1D-LUT processing unit 902 may be carried out on the luminance value obtained from the sensor unit 413 first, and after that, the luminance value may be converted into a density value by the density value conversion unit 901. That is, the processing order between the density value conversion unit 901 and the differential 1D-LUT processing unit 902 may be reversed.

$$D(X) = -\log(P(X)/P(0)) \quad \text{(Expression 1)}$$

The differential 1D-LUT processing unit 902 processes 1D-LUT data generated by a differential 1D-LUT generation unit 904 through a procedure which will be described below by using an LUT set by a differential 1D-LUT setting unit 903. In the differential 1D-LUT generation unit 904, the 1D-LUT data is generated on the basis of the target reference sensor light reception characteristic information illustrated in FIG. 8, the real machine sensor light reception characteristic information, and the spectral reflection factor characteristic information of the colorant of the target medium. In the following description, a case in which cyan is used as the colorant will be described as an example, and the processing is similarly carried out with regard to the other colorants. The spectral reflection factor characteristic information of the colorant is spectral reflection factor characteristic information with respect to the luminance value as the sensor output of the actual machine of the patch image which is changed in units of 10% from paper white (0%). The density value obtained from the sensor light reception characteristic information and the spectral reflection factor characteristic in accordance with this information corresponds to the horizontal axis in FIG. 9B. By using a spectral light emission characteristic of the LED corresponding to the sensor light reception characteristic of the sensor unit 413, a characteristic of the real machine sensor (the sensor unit 413) is set as $\alpha x(?)$, a characteristic of the reference sensor is set $\alpha 0(?)$ (it is noted however that $\lambda$ is from 380 nm to 700 nm), and a spectral reflection factor characteristic at N % (it is noted however that N is from 0 to 100) is set as $R(N, \lambda)$. A density value $Dx(N)$ of the real machine sensor is obtained through (Expression 2), and a density value $D0(N)$ of the reference sensor is obtained through (Expression 3).

$$Dx(N) = -\log(\Sigma(\alpha x(\lambda) \times R(N,\lambda))/(\Sigma(\alpha x(\lambda) \times R(0,\lambda)))) \quad \text{(Expression 2)}$$

$$D0(N) = -\log(\Sigma(\alpha 0(\lambda) \times R(N,\lambda))/(\Sigma(\alpha 0(\lambda) \times R(0,\lambda)))) \quad \text{(Expression 3)}$$

The vertical axis in FIG. 9B represents the density value obtained from the sensor luminance output value through (Expression 1). A density characteristic 905 of the real machine sensor is represented as a curved line composed of a solid line obtained while data of the measurement results on the patch images of the above-described real machine sensor is set as A0 to A10, and parts therebetween are interpolated. In addition, the density values from the sensor output values similarly obtained from the density values of the reference sensor through (Expression 3) are set as B0 to B10. A density characteristic of the reference sensor obtained by using the result of (Expression 3) on the basis of this curved line information is denoted by reference sign 906. C1 at which the density value at the density characteristic 905 of the real machine sensor at D0(1) calculated on the basis of the sensor light reception characteristic obtained from the information of the reference sensor and the spectral reflection factor characteristic of the medium is output at the value on Dx(1) corresponds to the output of the reference sensor. Similarly, the calculation is conducted also with regard to A2 to A10 and B2 to B10 so that the density characteristic 906 of the reference sensor is obtained. Data for correcting the density characteristic 905 of the real machine sensor into the density characteristic 906 of the reference sensor is generated in the differential 1D-LUT generation unit.

The colorimetric measurement device 415 performs a revision by using the reference white board or the like and reads the spectral reflection factor of the patch image (emits white light including all wavelengths and measures a reflection in a single wavelength area at every predetermined wavelengths) to output the result as the spectral reflection factor characteristic information. That is, the sensor unit 413 does not measure the spectral reflection factor at every predetermined wavelengths but the colorimetric measurement device 415 can measure the spectral reflection factor at every predetermined wavelengths. The spectral reflection factor characteristic information of the colorant for each medium obtained by measuring the patch image 702 by the colorimetric measurement device 415 is stored in the sensor correction information storage unit 414.

The spectral reflection factor characteristic information of the colorant obtained through the colorimetric measurement by the colorimetric measurement device 415 can be transmitted to another system (apparatus). With this configuration, it is possible to carry out the calibration processing at a high accuracy also in a system (apparatus) that does not include the colorimetric measurement device 415 or a system (apparatus) where the colorimetric measurement by the colorimetric measurement device 415 is not carried out. It is noted however that the printing system (apparatus) according to the present exemplified embodiment can also perform the calibration (although the correction accuracy is degraded) using the information that can be measured by the sensor unit 413 without using the information obtained by the colorimetric measurement device 415.

Figure 5:
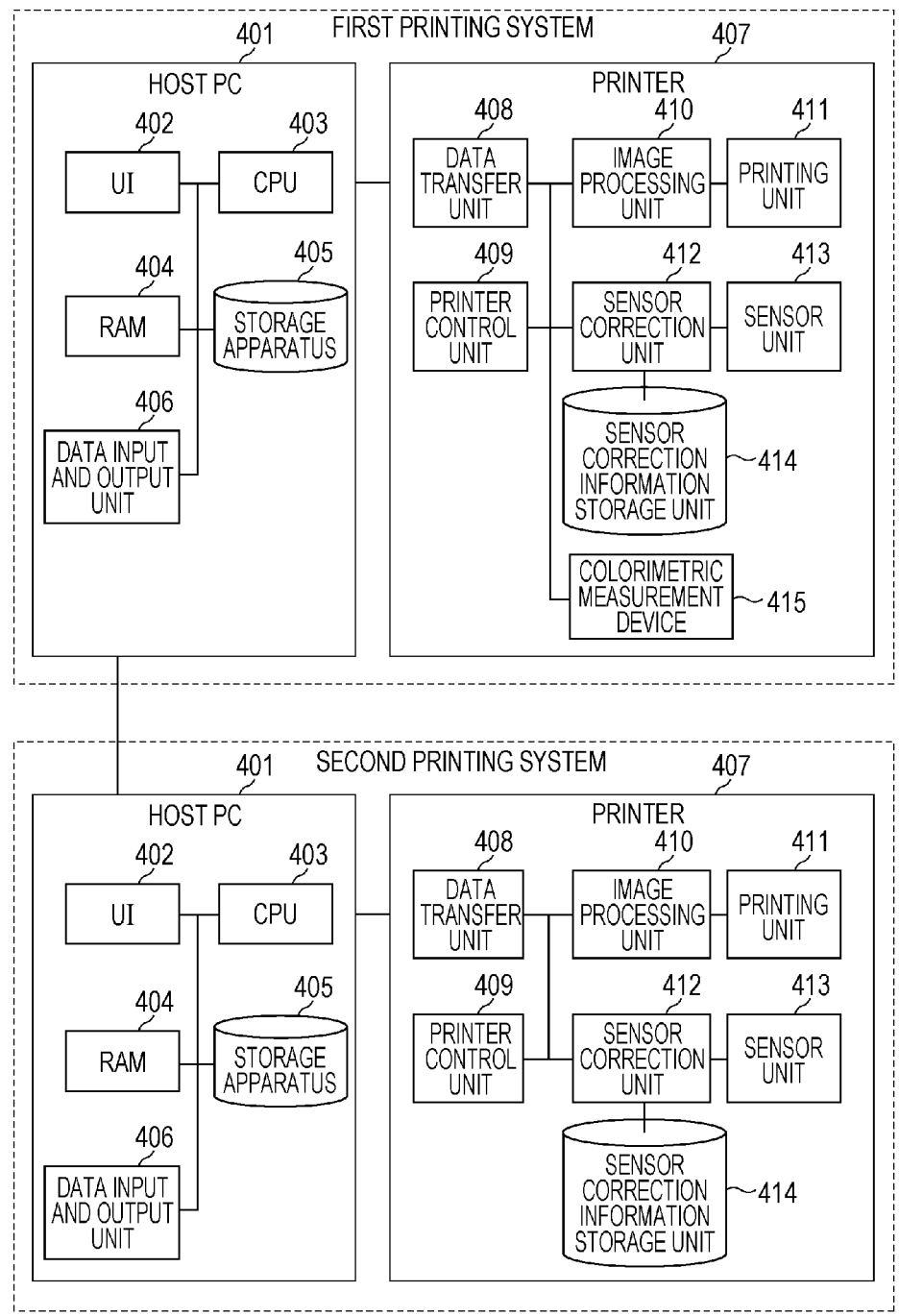
FIG. 5 is a block diagram of the system configuration according to the embodiment.
Figure 6:
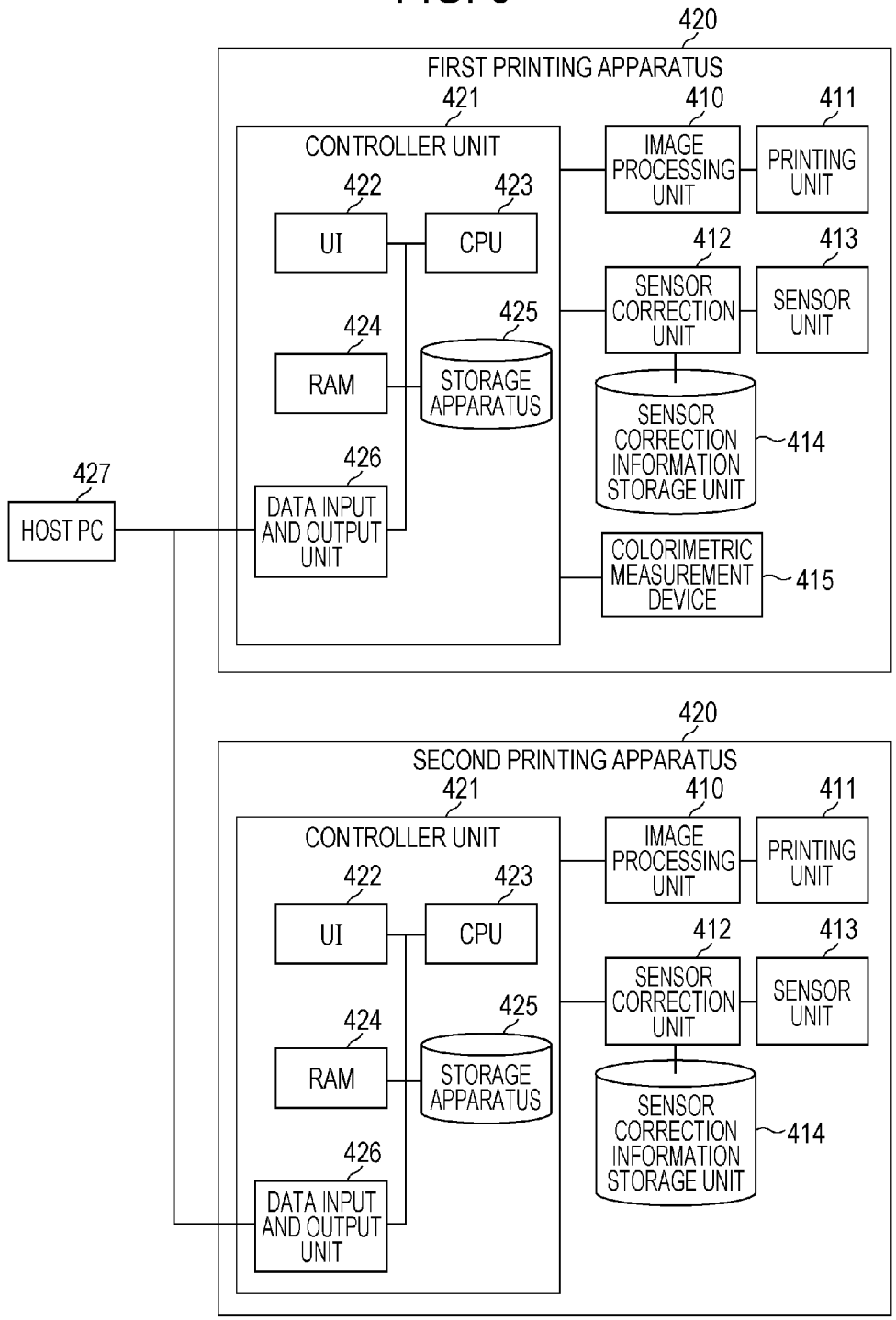
FIG. 6 is a block diagram of the system configuration according to the embodiment.

It is noted that the printing system illustrated in FIG. 4 is composed of the host PC 401, the printer 407, and the colorimetric measurement device 415, but a similar result can be obtained also in configurations other than the above-described mode. That is, as illustrated in FIG. 5, the colorimetric measurement device 415 may be built in (or mounted to) the printer 407. In this case, the printer control unit 409 controls the operation of the colorimetric measurement device 415. In addition, the processing conducted by the host PC 401 may be conducted by the printer 407. That is, as illustrated in FIG. 6, it is also possible to constitute a first printing apparatus 420 provided with a controller unit 421 where components equivalent to the components 402 to 406 of the host PC 401 are denoted by reference signs 422 to 426. In this case, instead of the printer control unit 409, the CPU 423 controls an operation of the first printing apparatus 420 (also including the colorimetric measurement device 415). Subsequently, the first printing apparatus 420 transmits and receives information with another apparatus such as a second printing apparatus that does not include the colorimetric measurement device 415 directly via a network or with the intermediation of a host PC 427. The respective printing apparatuses are connected to the host PC 427 via a local interface or a network. In addition, according to the mode including the host PC 401, the host PC 401 may perform a control including a control on the operation of the printer 407, may perform a control on an operation other than a data transfer by the printer control unit 409, and may appropriately share a processing with the host PC 401 and the printer control unit 409. Also, as in the example of FIG. 6, a single printing apparatus (printer) may perform a control on all the operations including the data transfer. In addition, in the above-described example, the apparatus provided with the colorimetric measurement device 415 is also provided with the sensor unit 413, but in a case where the colorimetric measurement device 415 can measure information that is to be measured by the sensor unit 413, the relevant apparatus may not be provided with the sensor unit 413. To elaborate, the configurations of the systems or apparatuses illustrated in FIGS. 4 to 6 are examples and may adopt other modes.

Next, the calibration processing in the above-described printing system or printing apparatus will be described. The following flow chart illustrates a processing carried out when a CPU executes a control program stored in the storage apparatus (memory) the system (apparatus) where the relevant processing is executed. The storage apparatus includes the storage apparatus 405, the memory in the printer control unit 409, and a storage apparatus 425. The CPU includes the CPU 403, the CPU in the printer control unit 409, and a CPU 423. It is noted however that all the processings may not be executed by software, and a part or all of the processings may also be realized by hardware such as an ASIC. In addition, with regard to the CPU, a single CPU may perform all the processings, and also plural CPUs may appropriately operate collaboratively to carry out the processing.

Figure 10:
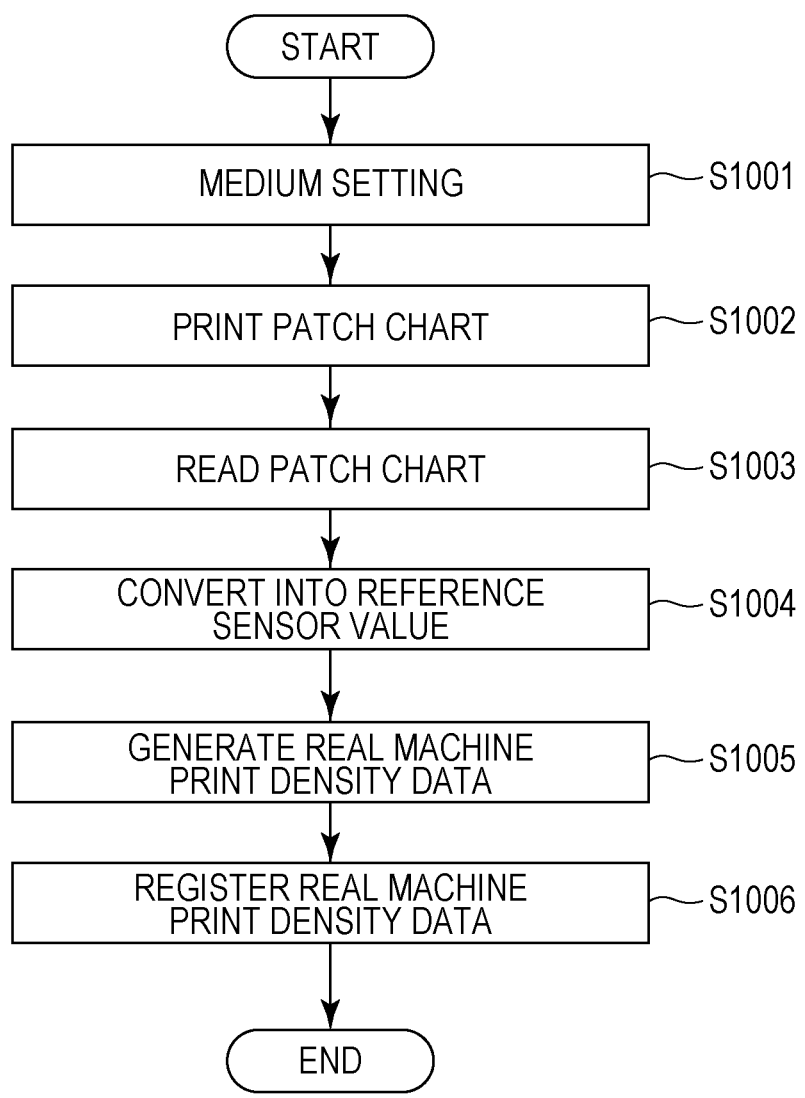
FIG. 10 is a flow chart illustrating a flow of a processing at a time when real machine print density data is registered on the basis of a measurement by the sensor unit.

FIG. 10 is a flow chart illustrating a flow of a processing at a time when the above-described real machine print density data is registered in the sensor correction information storage unit 414. Upon the execution of this flow chart, an input of an execution instruction of the calibration processing or parameters or the like used for the execution of the relevant processing is conducted from the UI 402 or 422.

In S1001, a setting on a medium (recorded medium) for carrying out a calibration processing is conducted. Herein, information of the identified medium is read out by using the UI 402 or 422 to set a type of the medium. With this configuration, various parameters in accordance with a type of the medium are read out from the storage apparatus 405, the memory of the printer control unit 409, or the storage apparatus 425.

Next, in S1002, the image of the patch chart for the calibration (the patch image 702) illustrated in FIG. 2 is printed on the medium set in S1001 by the printing unit 411 by using the parameters in accordance with the type of the medium set in S1001. This patch chart is also read out from the storage apparatus 405, the memory of the printer control unit 409, or the storage apparatus 425 to be output from the image signal I/F 101 as illustrated in FIG. 1. After that, the patch chart is applied with a half toning processing or the like to be printed without being subjected to the processing by the components 102 to 107.

Next, in S1003, the image of the patch chart printed in S1002 is read by using the sensor unit 413. That is, by using the LEDs 705 to 707 of the respective colors, images at the respective densities of the respective colorants in the patch chart of FIG. 2 are read.

Next, in S1004, by using the light reception characteristic information of the reference sensor, the light reception characteristic information of the real machine sensor, and spectral reflection factor information of the target medium, the conversion is conducted so that the light reception characteristic of the real machine sensor becomes the light reception characteristic of the reference sensor as described above by using FIG. 3.

Next, in S1005, the interpolation processing is carried out on the density output values of the reference sensor obtained in S1004 corresponding to the patch image the density of which is changed in units of 10% as described above, and real machine print density data is generated.

Next, in S1006, the real machine print density data generated in S1005 is stored in the sensor correction information storage unit 414.

Figure 11:
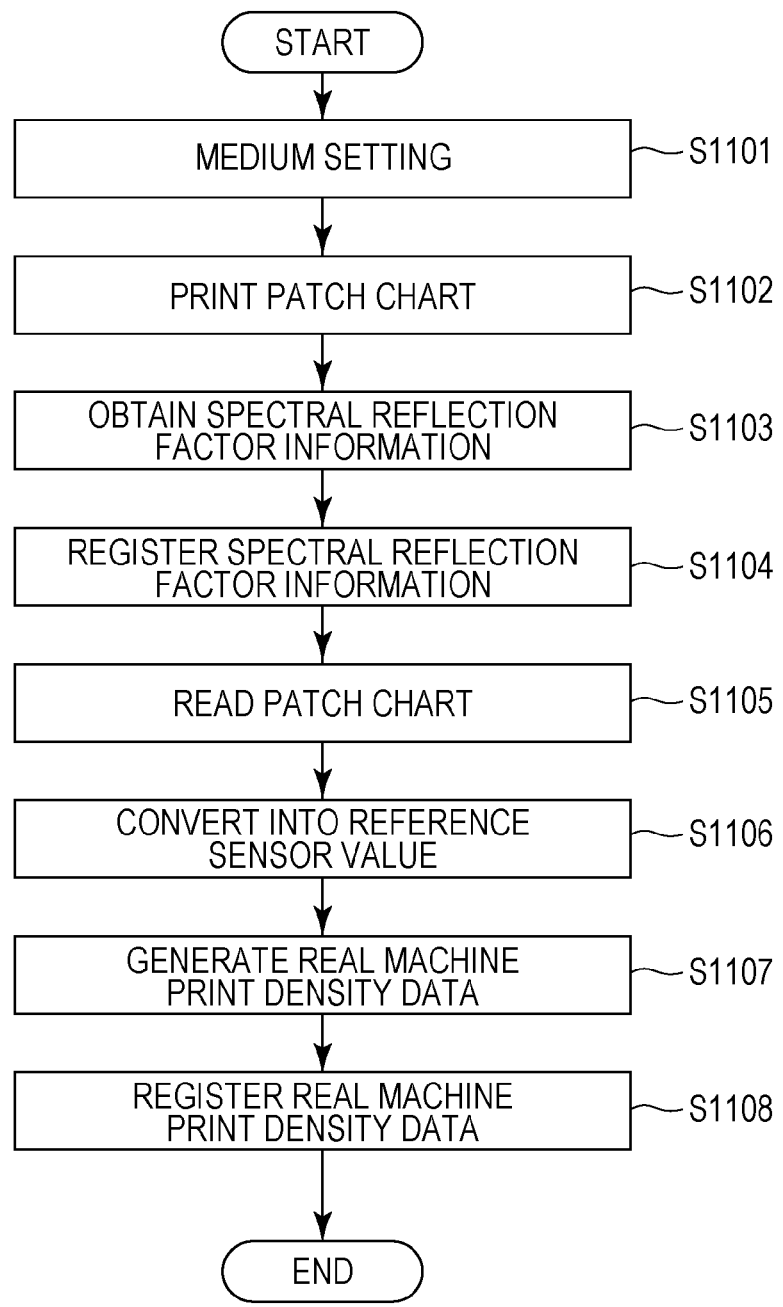
FIG. 11 is a flow chart illustrating a flow of a processing at a time when the real machine print density data is registered on the basis of a measurement by a colorimetric measurement device.

Next, an addition processing for the calibration information of the unidentified medium will be described. FIG. 11 is a flow chart of a flow of this processing.

In S1101, a setting on a medium to be added is conducted. Herein, since the medium is an unidentified medium, a type of the medium to be added is input by using the UI 402 or 422. Subsequently, the parameters used for the calibration processing are read out. Spectral light reception characteristic information of the reference sensor and spectral light reception characteristic information of the real machine sensor which are independent of the characteristic of the medium may be left as alone, but a calibration target density value and spectral reflection factor information of the medium which are dependent of the characteristic of the medium are to be newly obtained. In view of the above, in the addition of the calibration information of the unidentified medium, a print state in this processing is set as a reference. That is, as the medium related information of FIG. 8, the real machine print density data and the calibration target value are registered as the same value. Subsequently, before the measurement by the real machine sensor in S1105, the colorimetric measurement device 415 obtains the spectral reflection factor characteristic information of the colorant (S1103) to be registered while being associated with the information (medium name) for identifying the medium set in S1101. The other processings are similar to the processings illustrated in FIG. 10, but the reference density value in S1106 corresponding to "the conversion into the reference sensor value" is measured in S1103, and the spectral reflection factor of the unidentified medium registered in S1104 is used.

Figure 12:
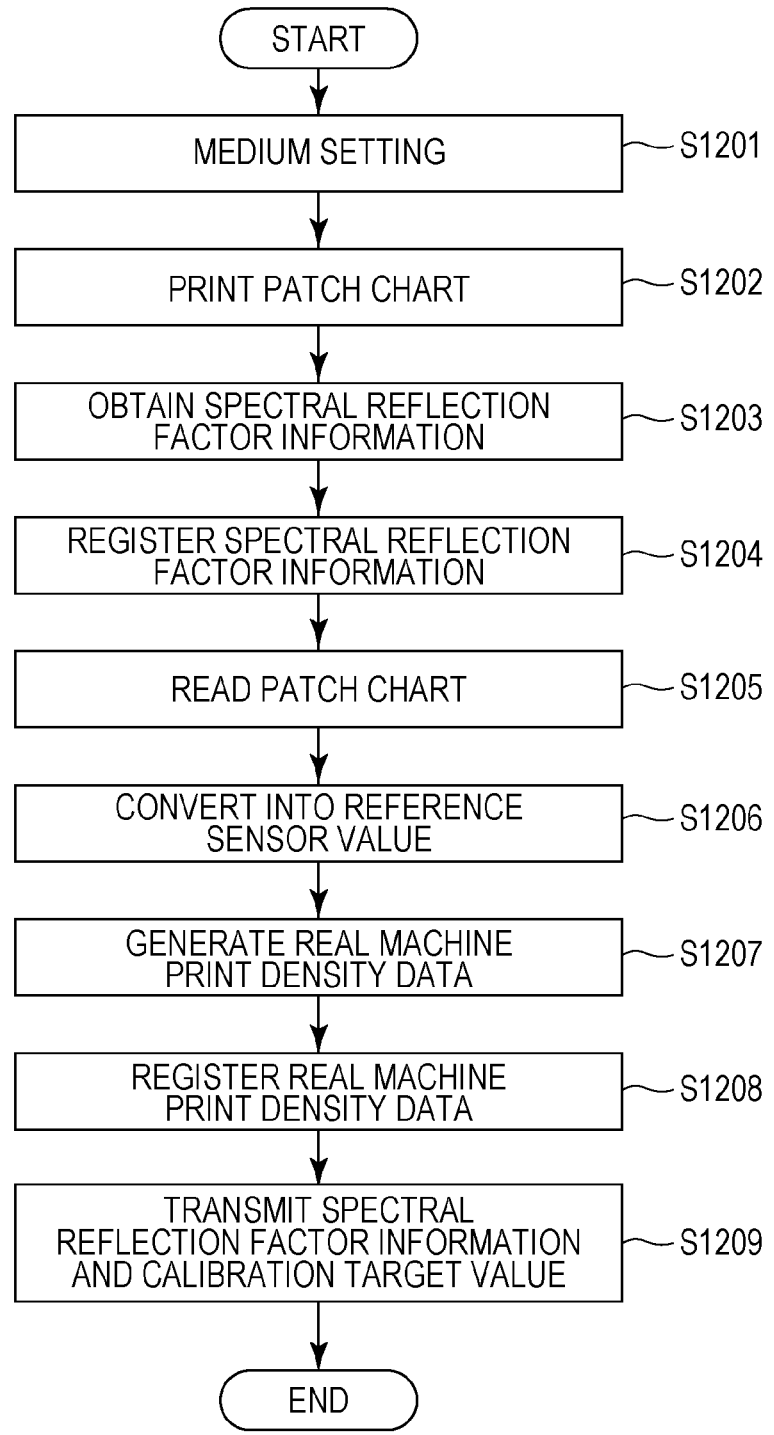
FIG. 12 is a flow chart illustrating a flow of a processing at a time when calibration information based on the measurement by the colorimetric measurement device is transmitted.

Next, a processing of transmitting the calibration information with regard to the unidentified medium which is created in the system (apparatus) including the colorimetric measurement device 415 to another system (apparatus) will be described. FIG. 12 is a flow chart illustrating a flow of a processing in the system (apparatus) including the colorimetric measurement device 415.

S1201 to S1208 are similarly executed as in the processing of FIG. 11. In S1209, a printing system or printing apparatus that is not provided with the colorimetric measurement device 415, does not perform the colorimetric measurement by the colorimetric measurement device 415, or does not have the colorimetric measurement result by the colorimetric measurement device 415 is specified as a transmission destination by using the UI 402 or 422. Subsequently, the calibration target value data of the colorant of an unidentified medium (added medium X) based on the colorimetric measurement result by the colorimetric measurement device 415 and the spectral reflection factor characteristic information are transmitted to the specified printing system (apparatus) as the calibration information.

Figure 13:
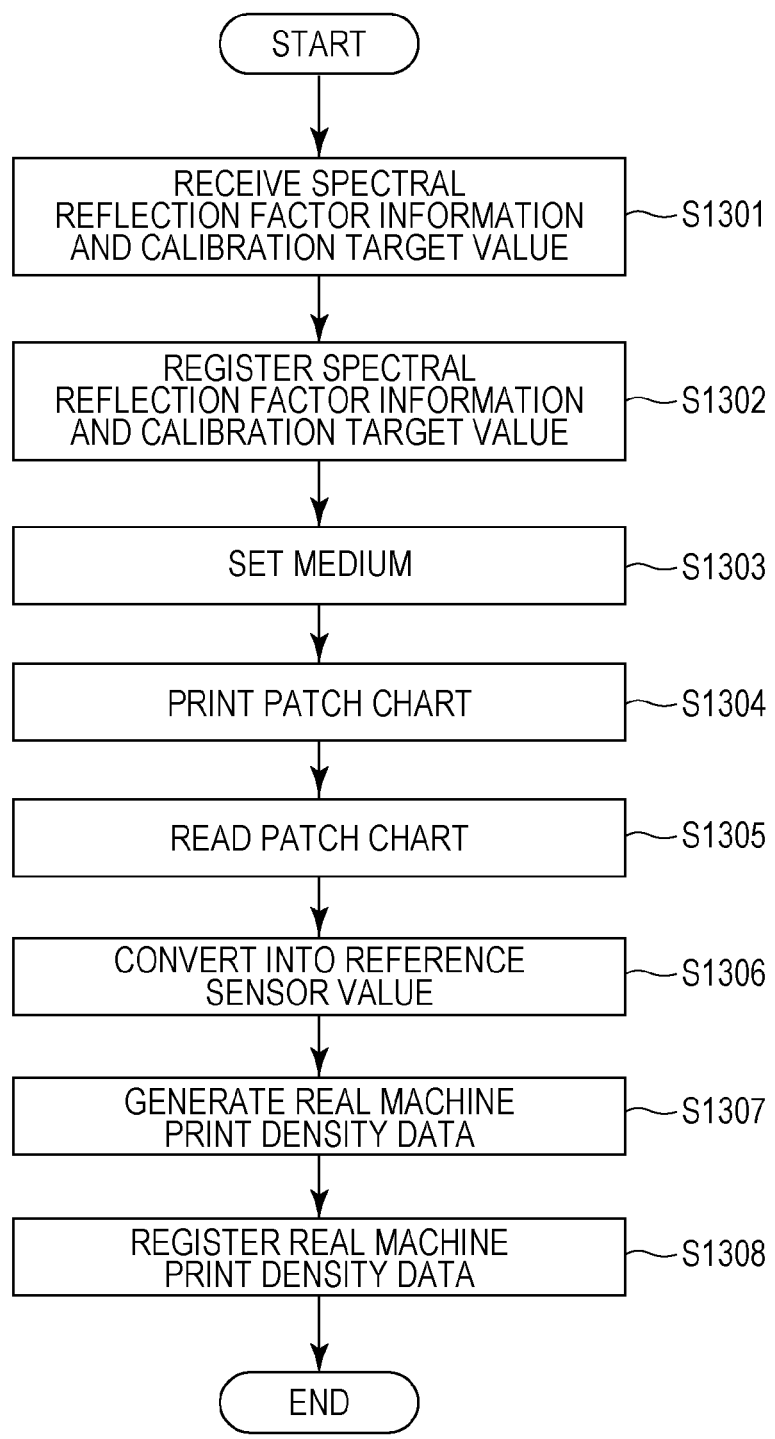
FIG. 13 is a flow chart illustrating a flow of a processing at a time when the calibration information based on the measurement by the colorimetric measurement device is received.

The printing system (apparatus) specified as the transmission destination in S1209 registers the calibration information of the added medium X in accordance with a flow chart illustrated in FIG. 13 in the sensor correction information storage unit 414. That is, in S1301, the spectral reflection factor information and the calibration target value data are received, and the received information is registered in the sensor correction information storage unit 414 in S1302. In S1303 to S1308, similarly as in the processing illustrated in FIG. 11, the calibration is carried out by using the information registered this time.

It is noted that in the above description, the spectral reflection factor information and the calibration target value data (target density information) are transmitted from the system (apparatus) provided with the colorimetric measurement device. Then a system (apparatus) that is not provided with the colorimetric measurement device carry out the calibration on the basis of these pieces of received information and the density information measured by itself. However, the target density information may not be transmitted from the system (apparatus) provided with the colorimetric measurement device, and the target density information may be calculated in accordance with the spectral reflection factor information received by the system (apparatus) that is not provided with the colorimetric measurement device.

As described above, according to the present exemplified embodiment, the information for the calibration obtained by conducting the colorimetric measurement on the patch image by the colorimetric measurement device provided to the single printing system (apparatus) can be transferred to another printing system (apparatus) or the other plural printing systems (apparatuses) to be utilized. Therefore, it is possible to carry out the high accuracy calibration processing in the large number of printing systems (apparatuses) without the provision of the colorimetric measurement device. That is, it is possible to easily conduct the calibration for the printing performed in plural printing apparatuses at a satisfactory accuracy by using spectral reflection factor information which is obtained by using a measurement device the colorimetric measurement device.

In addition since the calibration using the colorimetric measurement device can be conducted also in the printing system (apparatus) that includes an inexpensive sensor unit (color sensor) composed of a light source having a peak at a predetermined wavelength and a light receiving element but does not include the colorimetric measurement device provided with a color filter of multiple bands or a diffraction grating, it is possible to introduce the plural printing systems (apparatuses) at a low cost. Since the correction is conducted in accordance with the light intensities of the respective light sources that also actually measure the individual difference of the sensor unit at this time, the highly accurate calibration can be carried out. It is noted that the colorimetric measurement device may have a colorimetry provided with a color filter of multiple bands or a diffraction grating.

Also, at the time of the transmission and reception of the calibration information, the information obtained on the basis of the measurement by the colorimetric measurement device is transmitted and received, and the information obtained on the basis of the measurement by the sensor unit is not transmitted and received, so that the amount of the calibration information to be transmitted and received can be reduced, and the increase in the communication traffic can be suppressed. Subsequently, the calibration is carried out on the basis of the measurement result by its own sensor unit and the received calibration information on the side where the calibration information is received, and therefore it is possible to carry out the highly accurate calibration in accordance with its own print state. In addition, when a recorded medium of a new type is used, new calibration information is easily generated by the system (apparatus) including the colorimetric measurement device to be also reflected on another system (apparatus). It is noted that when the calibration information is transmitted, for example, in a case where the printing system (apparatus) at the transmission destination does not also include the sensor unit, a case where the measurement by the sensor unit is not conducted, or the like, the information obtained on the basis of the measurement result by the colorimetric measurement device and also the information obtained on the basis of the measurement result by its own sensor unit may be transmitted. Subsequently, the calibration information is registered on the basis of these pieces of information on the side where the pieces of information are received, and the calibration information is used at the time of the calibration. With this configuration, it is also possible to suppress the load and the like on the reception side.

It is noted that according to the above-described exemplified embodiment, each of the printing system, the host PC, and the printer may function as an image processing apparatus configured to perform the generation and obtainment of the calibration information.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In addition, the program may be executed by a single computer or executed by plural computers while being operated in a cooperative manner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-257431, filed Nov. 25, 2011 which is hereby incorporated by reference herein in its entirety.

What is claimed is:
1. An image processing apparatus comprising:
a reception unit configured to receive spectral reflection factor information measured by reading a patch image for calibration printed on a recorded medium by using a measurement device capable of measuring a spectral reflection factor at every predetermined wavelengths;
a generating unit configured to generate a look-up table based on reference sensor light reception characteristic information, light reception characteristic information of a real machine sensor and the spectral reflection factor information; and a correction unit configured to correct a density characteristic of the real machine sensor into a density characteristic of a reference sensor corresponding to the reference sensor light reception characteristic information based on the generated look-up table.

2. The image processing apparatus according to claim 1, wherein the measurement device is provided to another printing apparatus different from the printing apparatus, and the patch image for the calibration printed by the another printing apparatus by using a recorded medium of a same type as the recorded medium is measured.

3. The image processing apparatus according to claim 1, further comprising a printing unit.

4. The image processing apparatus according to claim 1, further comprising a storing unit configured to store the reference sensor light reception characteristic information and the light reception characteristic information of the real machine sensor.

5. The image processing apparatus according to claim 1, wherein the patch image includes a plurality of patches.

6. An image processing method for an image processing apparatus, the method comprising:

receiving spectral reflection factor information measured by reading a patch image for calibration printed on a recorded medium by using a measurement device capable of measuring a spectral reflection factor at every predetermined wavelengths;

generating a look-up table based on reference sensor light reception characteristic information, light reception characteristic information of a real machine sensor and the spectral reflection factor information; and correcting a density characteristic of the real machine sensor into a density characteristic of a reference sensor corresponding to the reference sensor light reception characteristic information based on the generated look-up table.

7. The image processing method according to claim 6, wherein the measurement device is provided to another printing apparatus different from the printing apparatus, and the patch image for the calibration printed by the another printing apparatus by using a recorded medium of a same type as the recorded medium is measured.

8. The image processing method according to claim 6, wherein the image processing apparatus comprises a printing unit.

9. The image processing method according to claim 6, further comprising storing the reference sensor light reception characteristic information and the light reception characteristic information of the real machine sensor.

10. The image processing method according to claim 6, wherein the patch image includes a plurality of patches.

11. A non-transitory computer-readable storage medium storing computer-executable instructions for causing an image processing apparatus to perform a method comprising:

receiving spectral reflection factor information measured by reading a patch image for calibration printed on a recorded medium by using a measurement device capable of measuring a spectral reflection factor at every predetermined wavelengths;

generating a look-up table based on reference sensor light reception characteristic information, light reception characteristic information of a real machine sensor and the spectral reflection factor information; and correcting a density characteristic of the real machine sensor into a density characteristic of a reference sensor corresponding to the reference sensor light reception characteristic information based on the generated look-up table.

12. An image processing apparatus comprising:

a reception unit configured to receive spectral reflection factor information measured by reading a patch image for calibration printed on a recorded medium by using a measurement device capable of measuring a spectral reflection factor at every predetermined wavelengths;

a generating unit configured to generate a look-up table based on reference emission spectroscopy characteristic information, emission spectroscopy characteristic information of a real machine sensor and the spectral reflection factor information; and a correction unit configured to correct a density characteristic of the real machine sensor into a density characteristic of a reference sensor corresponding to the reference emission spectroscopy characteristic information based on the generated look-up table.

13. The image processing apparatus according to claim 12, further comprising a printing unit.

14. The image processing apparatus according to claim 12, further comprising a storing unit configured to store the reference emission spectroscopy characteristic information and the emission spectroscopy characteristic information of the real machine sensor.

15. The image processing apparatus according to claim 12, wherein the patch image includes a plurality of patches.

* * * * *